United States Patent
Kaneko et al.

[15] 3,653,336
[45] Apr. 4, 1972

[54] AUTOMATIC MOLDING APPARATUS FOR PRODUCING RING-SHAPED DOUGHNUTS CONTAINING FILLINGS

[72] Inventors: Ryutano Kaneko; Yoshio Kaneko, both of 1-8, Sannon-cho, Minami-ku, Yokohoma-shi, Japan

[22] Filed: Oct. 19, 1970

[21] Appl. No.: 82,057

[30] Foreign Application Priority Data

Oct. 22, 1969 Japan.................................44/84053

[52] U.S. Cl............................................425/133, 425/289
[51] Int. Cl. .........................................................A21d 11/16
[58] Field of Search.................107/14 R, 14 B, 14 BA, 14 E, 107/1 D, 1 H, 14 A, 1 R; 17/35–40; 18/30, 12–14; 25/8, 11–20; 31/8, 13, 14; 73/253, 255, 261

[56] References Cited

UNITED STATES PATENTS 2,643,620  6/1953  Miller..................................107/14 E
2,779,298  1/1957  Chwirut et al........................107/14 E
3,499,396  3/1970  Kaufman et al. ....................107/14 E

*Primary Examiner*—Jordan Franklin
*Assistant Examiner*—Geo. V. Larkin
*Attorney*—Flynn & Frishauf

[57] ABSTRACT

An automatic molding apparatus for producing ring-shaped doughnuts with one or more kinds of filling contained therein in annular form, wherein uncooked dough and filling are separately stored in coaxially arranged hoppers, each of which has an inlet opened at the upper end to allow the raw material to be easily charged at a desired time under atmospheric pressure without stopping the apparatus; the dough is squeezed out at predetermined intervals from an annular opening defined between two cylindrical outlet pipes; the filling such as cream or jam is drawn out, also at predetermined intervals, from an annular opening positioned within the hole of the preliminarily formed dough so as to be completely wrapped in the dough; the mixed mass being taken out of the apparatus to be subjected to frying or other means of cooking in the succeeding process.

11 Claims, 24 Drawing Figures

AUTOMATIC MOLDING APPARATUS FOR PRODUCING RING-SHAPED DOUGHNUTS CONTAINING FILLINGS

The present invention relates to an automatic molding apparatus for adding desired kinds of filling such as bean-jam, cream, fruit jam or raw flesh or fish in paste form as the core material of a ring-shaped doughnut.

An object of the present invention is to provide an automatic highly efficient molding apparatus for producing ring-shaped doughnuts containing fillings which is capable of feeding dough and filling at desired intervals during operation.

Another object of the invention is to provide an automatic doughnut molding apparatus for adding desired kinds of filling properly and uniformly as the core material of a ring-shaped doughnut.

The automatic doughnut molding apparatus according to the invention is provided with hoppers containing properly prepared dough and filling separately and capable of feeding them at a desired time. The hoppers have a raw material inlet opened to the air at the upper end so as to receive the raw material under atmospheric pressure, the filling hopper being concentrically disposed in the dough hopper. At the center of a vertical dough feed pipe communicating with the dough hopper is set a filling feed pipe communicating with the filling hopper. At several places of a dough passage defined by the dough hopper and dough feed pipe is provided a spiral feed blade whose intermittent rotation causes the dough received in the dough hopper to be delivered from an annular feed part at the end of the dough feed pipe.

The end of the filling feed pipe is fitted with a flange at a prescribed clearance from the end of the dough feed pipe, thereby defining the aforesaid annular feed port for the dough between said flange and the end of the dough feed pipe. Said flange has the same outer diameter as that of the dough feed pipe.

Into the outer wall of the dough feed pipe is inserted a sleeve whose lower end forms a blade. The vertical movement of the sleeve permits the opening and closure of the dough feed port and the cutting of the dough delivered.

Below the dough feed port is formed an annular filling feed port by means of the flange. Said filling feed port may be fitted with a disc at a prescribed space from the flange, or constituted by a cylindrical valve slidably fitted to a shaft fixed at the center of the filling feed pipe and elastically pressed against the flange by means of a spring.

The aforesaid disc or cylindrical valve has the same outer diameter as that of the dough feed pipe. Upon vertical movement of the sleeve, the disc serves for the opening and closure of the filling feed port and the cutting of the filling drawn out, whereas the cylindrical valve itself moves to this end. In either case, there is fitted into the filling feed pipe a piston provided with a one-way valve or stop valve which is closed to force filling forward when the piston advances and is opened to allow for its passage when the piston retreats. Thus the filling is delivered only at the forward movement of the piston.

The present invention comprises feeding filling in annular form to the inside of a cylindrical form of dough material delivered from the annular feed port so as to cause said filling to be wrapped in the dough. When filling is drawn out in annular form to the inside of the cylindrical dough material, then that part of the dough swells outward. The combination of two split molding bowls for receiving said swollen portion of the dough and the cylindrical valve or disc made of flexible elastic material permits the molding of dough containing fillings as the core material.

The split molding bowls can be opened and closed in such a manner that when closed, they move vertically along the axis of the sleeve while surrounding its outside from both sides. Where the sleeve is surrounded by split molding bowls together assuming such a cross sectional form as leaves out a closed annular void space, then proper molding is effected by filling said void space with additional dough after the bowls receive swollen dough. Again where the sleeve is surrounded by split molding bowls together assuming such a cross sectional form as leaves out an annular void space open at the lower end, then the sleeve is lowered to cut the dough and filling delivered and shut off supply after said swollen dough is received in the split molding bowls. Next when the molding bowls are brought down, the dough attached to the elastic disc does not come off even if the disc is curved downward under the weight of the dough, so that further fall of the molding bowls causes the lower end portion of the cylindrical dough to be rolled inward and finally rubbed with the outer edge of the elastic disc, thereby effecting the molding of a ring-shaped doughnut with a substantially circular cross section.

Around the outer periphery of a cutter cylinder contacting the lower peripheral edge of a cutter flange is formed a groove so as to cause the dough to be rolled inward. When a prescribed amount of filling is supplied in annular form from the inside of the cylindrical dough, the lower end of the cylindrical dough is still tightly fitted into the groove formed in the periphery of the bladed cylinder, and does not come off, so that the descent of the sleeve permits filling to be favorably inserted into the cylindrical dough from its lower end.

Molding may also be conducted by removing said dough ring incorporated with filling when the sleeve is brought down to its lowest position. In this case, neither elastic disc nor split molding bowls are required. The bladed cylinder may assume not only the form used in the present invention, but also any other shape. Further, if necessary, there may be fitted any other type of elastic disc.

The vertical movement of the sleeve, the reciprocation of a piston rod the lifting, lowering, opening and closing of the split molding bowls and the intermittent rotation of the spiral blade permit application of the known cam-link mechanism. All these movements can be carried out as desired in proper time sequence. The apparatus of the present invention is applicable in preparing confectionary doughnuts, yeast doughnuts or those made of other material by properly adjusting the form of a spiral feed blade provided in the hopper or dough passage and the speed of the intermittent or continuous rotation of said blade.

Where the apparatus of the invention is used in making confectionary doughnuts, it is preferred that it be fitted above the side of a fryer so as to fry molded doughnuts with oil as soon as they are finished. Further, it is desired that the split molding bowls be made of Teflon and the elastic disc be formed of silicone rubber, that is, both members be prepared from heat resistant material. Where yeast doughnuts are manufactured, the apparatus of the invention is preferably positioned above a conveyor connected to the succeeding process.

For the apparatus of the invention, it is further preferred that there be fitted to the lower end of a shaft disposed at the center of a filling feed pipe a cutter cylinder normally pressed against a cutter flange by a spring. This cutter cylinder is brought downward for a short time against the force of the spring due to the pressure applied to filling when the piston provided in the filling feed pipe is operated, thereby forming an annular outlet through which there is delivered a prescribed amount of filling. When the pressure applied on the filling decreases upon retreat of the piston, the cutter cylinder is brought back to its original position by the force of the spring to cut the filling delivered and close the outlet.

Since the cutting of delivered filling and the closure of its outlet are performed by the cutter sleeve independently of the delivery of dough and the closure of its outlet, the dough ring is not cracked at the joined part when fried with oil, because the same dough materals are joined together.

The objects and characteristics of the present invention will be more fully understood from the following description taken with reference to the appended drawings. Throughout the drawings, the same parts are denoted by the same numerals.

Figure 1:
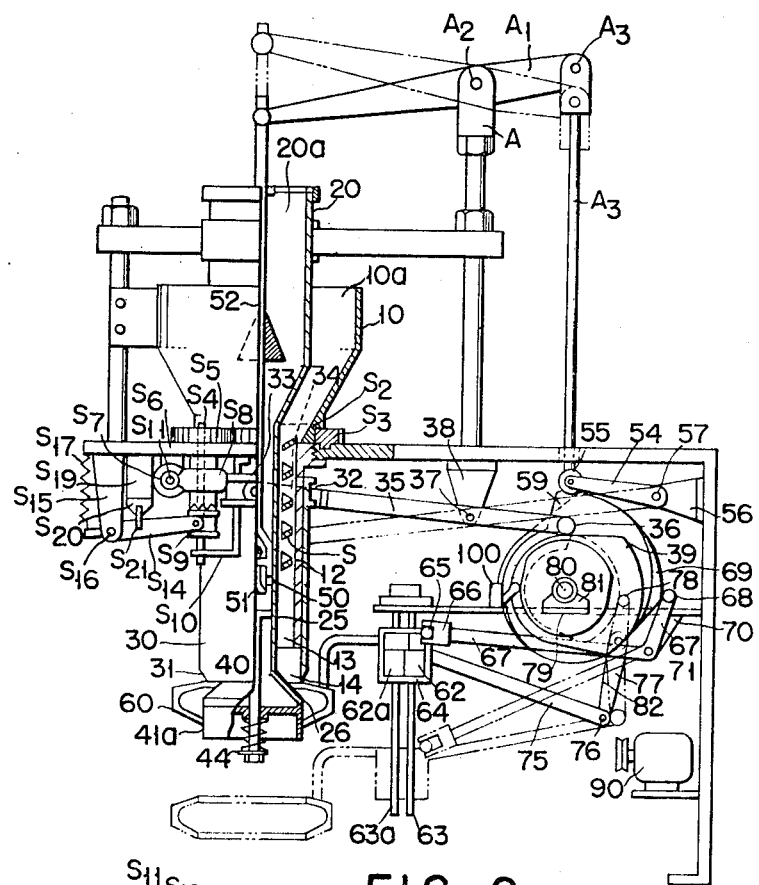
FIG. 1 is a side view, partly in section, of an automatic doughnut molding apparatus according to an embodiment of the present invention.

FIG. 8 indicates the sequential steps of molding a doughnut according to a second embodiment of the invention; and FIG. 9 shows the sequential steps of molding a doughnut according to a third embodiment of the invention.

There will now be described by reference to FIGS. 1 to 5 an automatic doughnut molding apparatus according to a first embodiment of the present invention. A dough hopper 10 has an inlet 10a opened at the upper part so as to receive dough at desired intervals. To the outside of a dough feed pipe 12 communicating with the lower end of the dough hopper 10 is fitted a vertically slidable sleeve 30. The lower edge of the sleeve 30 forms a blade 31, and the upper periphery thereof is provided with an annular groove 32. At the center of the dough feed pipe 12 is positioned a filling feed pipe 25, the gap between the two feed pipes constituting a dough passage 13. To the lower end of the filling feed pipe 25 is fixed a cutter flange 26 having the same outer diameter as that of the dough feed pipe 12 at a prescribed space from the lower end of said pipe 12, thereby forming a dough outlet 14. At the center of the filling feed pipe 25 is positioned a support shaft 40, under which there is disposed a cutter cylinder 41a having the same outer diameter as that of the dough feed pipe 12, the vertical sliding of said cutter cylinder 41a providing a filling outlet 27. At the center of the dough hopper 10 is provided a filling hopper which has an inlet 20a opened at the upper part so as to receive filling at desired intervals. The lower end of the filling hopper 20 communicates with the filling feed pipe 25, into which there is fitted a piston 50. At the center of the piston 50 is fixed a one-way valve 51 which is closed to force filling forward when the piston advances and is opened to allow for the passage of filling upon retreat of the piston. There is provided a piston rod 52 which vertically penetrates the filling feed pipe 25 and filling hopper 20 and projects to the outside at the upper part of said hopper 20. The upper end of the piston rod 52 is engaged with one end of the later described lever $A_1$.

Figure 3:
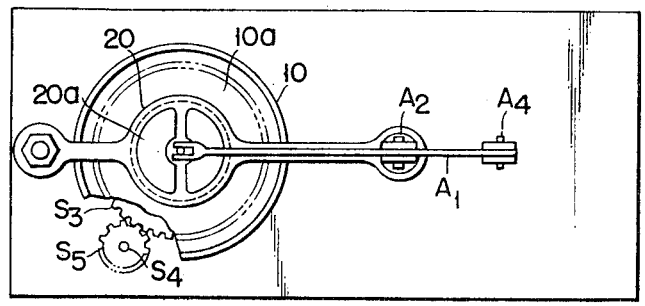
FIG. 3 is a top plan view of the same.
Figure 4:
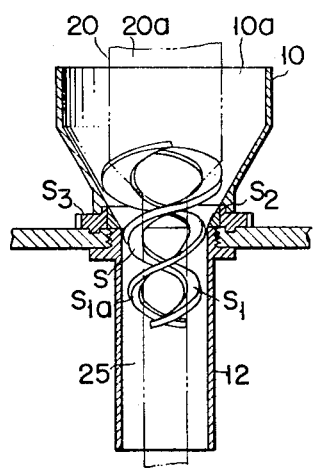
FIGS. 4 and 5 are fragmental cross sectional views of different spiral feed blades disposed in the dough hopper and dough passage used in a first embodiment of the invention.
Figure 5:
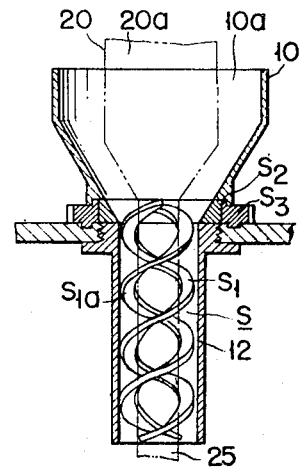

The spiral feed blade S is rotatably set in the dough passage 13 so as to surround the filling feed pipe 25. This spiral feed blade S consists, as shown in FIGS. 4 and 5, of two spiral members $S_1$ and $S_{1a}$ fixed to a blade fixing ring $S_2$ in mutually facing relationship. The blade fixing ring $S_2$ is engaged with a gear $S_3$ rotatably set at the joint of the dough hopper 10 and dough feed pipe 12 so as to rotate jointly with said gear $S_3$. The gear $S_3$ is engaged, as illustrated in FIGS. 1 and 3, with a pinion $S_5$ fitted to a shaft $S_4$. This shaft $S_4$ is supported by a bearing $S_6$ mounted on a stand in a manner to project downward, the lower end of said shaft $S_4$ being supported by a bearing bracket $S_{10}$.

Figure 2:
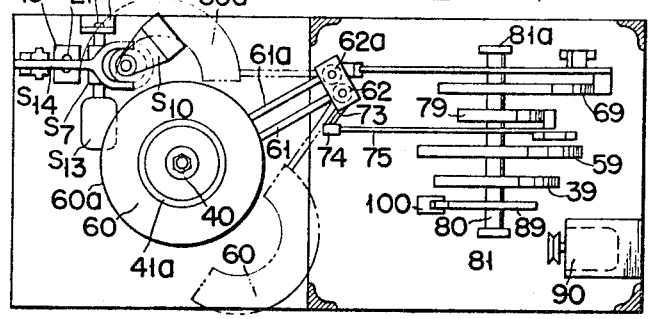
FIG. 2 is a bottom plan view of the same.

To the shaft $S_4$ is rotatably fitted a worm gear $S_8$ registering with a worm $S_7$. The worm gear $S_8$ has clutch teeth formed on the end face of its boss and is detachably engaged with a clutch $S_9$ key stopped on the shaft $S_4$ so as to move in its axial direction. On the periphery of the clutch $S_9$ is formed an annular groove with which there is engaged the end of a fork lever $S_{14}$ for moving the clutch $S_9$. This fork lever $S_{14}$ permits the clutch $S_9$ to move vertically. The fork lever $S_{14}$ has its intermediate part pivoted to a bracket $S_{15}$ by a pin $S_{16}$, and is rotatably deflected by a tension spring $S_{17}$ in such a direction as disengages the clutch $S_9$. To the fork lever $S_{14}$ is fitted through a connection metal part $S_{21}$ the end of the plunger $S_{20}$ of an electromagnet $S_{19}$ electrically connected to a microswitch 100. When the plunger $S_{20}$ is attracted to the electromagnet $S_{19}$ by its excitation, the fork lever $S_{14}$ is rotated against the force of the tension spring $S_{17}$, to engage the clutch $S_9$ with the worm gear $S_8$. The worm $S_7$ engaged with the worm gear $S_8$ is coupled, as shown in FIG. 2, with a speed changeable motor $S_{13}$ and fitted to a drive shaft $S_{11}$ supported by the bearing $S_{12}$.

Figure 6:
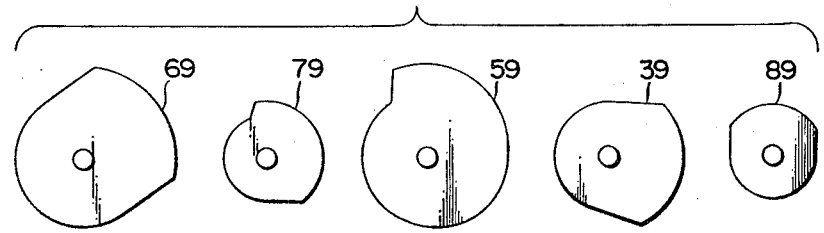
FIG. 6 illustrates the profiles of five cams used in said embodiment.

The rotation of a motor 90 mounted on a stand is transmitted through a speed change gear to a main shaft 80 supported by bearings 81 and 81a by means of belt drive so as to rotate said main shaft 80. To the main shaft 80 are fitted through a clutch (not shown) five grooved cams 39, 59, 69, 79 and 89 having different profiles illustrated in FIG. 6.

The cam 39 for the vertical movement of the sleeve 30 is engaged with a roller 36 disposed at the end of a lever 35 rotatably pivoted to the pivotal shaft 37 of a support metal part 38 mounted on a stand. To a fork 34 formed at the other end of the lever 35 is fitted a roller 33 so as to be engaged with the groove 32 of the sleeve 30. The cam 59 for the reciprocation of the piston 50 is engaged with a roller 55 positioned at the end of a lever 54 pivoted to the pivotal shaft 57 of a metal part 56 mounted on a stand.

The aforementioned lever $A_1$ has its intermediate part pivoted by a pin $A_2$ to a support member A so as to rotate in a vertical direction. To one end of said lever $A_1$ is connected by a pin $A_4$ a rod $A_3$ pivoted to the end of the lever 54. The other end of said lever $A_1$ is connected to the upper end of the piston rod 52.

The cam 69 for the vertical movement of the split molding bowls 60 and 60a is engaged with a roller 68 set at the end of a lever 67 assuming a flattened reversed L-shape (that is, a ⌐ form) which is pivoted by a pivotal shaft 71 to a metal part mounted on a stand. The forked portion 66 at the other end of the lever 67 is engaged with a projection 65 at the top of a box member 64. The box member 64 contains two small gears 62 and 62a fitted to two guide shafts 63 and 63a respectively vertically mounted on a stand so as to move up and down for mutual engagement.

To the bosses of said two small gears 62 and 62a are fixed the arm rods 61 and 61a of the split molding bowls. The cam 79 for the opening and closing of the split molding bowls is engaged with a roller 78 positioned at the end of a lever 77 having its intermediate part pivoted to a metal part 82 mounted on a stand.

To the other end of the lever 77 is pivoted by a pin 76 one end of a connecting rod 75. The other end of this connecting rod 75 is connected through a spherical node 74 to an arm rod 73 engaged with the boss of one small gear 62 described above (FIG. 2).

The aforementioned cams 39, 59, 69, 79 and 89 and a series of levers interlocking therewith enable the delivery of filling by reciprocation of the piston 50, the delivery of dough by the vertical movement of the sleeve 30, the cutting of the dough and filling delivered, the vertical sliding of the split molding bowls 60 and 60a along the axis of the sleeve, the opening and closing of said split molding bowls while surrounding the outside of the sleeve and the intermittent rotation of the spiral feed blade; all these to be repeatedly performed in a desired time sequence under a well controlled condition due to the suitable profiles assumed by said cams. It will be apparent that to avoid the intrusion of dirt and dust, the inlets 10a and 20a opened at the upper part of the dough hopper 10 and filling hopper 20 may be provided with a suitable covering or cap.

In operation, there are charged properly prepared dough and filling into the respective hoppers 10 and 20 through the inlets 10a and 20a. The motor 90 is rotated to drive the main shaft 80. The motor $S_{13}$ for the spiral feed means is rotated to drive the worm $S_7$ and in turn the worm gear $S_8$. First, there is drawn out dough from the outlet 14 by the spiral feed blade S. There will now be described a procedure of stopping the delivery of dough. When the microswitch 100 is operated (i.e., turned on) by the action of the cam 89 through the rotation of the main shaft 80, the electromagnet $S_{19}$ is excited to attract the clutch lever $S_{14}$ against the force of the tension spring $S_{17}$, thereby causing the clutch $S_9$ to be engaged with the clutch teeth of the worm gear $S_8$. Accordingly, the shaft $S_4$ and worm gear $S_8$ are interlocked with each other to rotate the pinion $S_5$. Further, the spiral feed blade S rotates through the gear $S_3$ to cause the dough received in the dough hopper 10 to be delivered only when the dough outlet 14 at the bottom of said hopper 10 is opened due to the rise of the sleeve 30. When the sleeve 30 falls to close said outlet 14, the microswitch 100 is turned off by the rotation of the cam 89 and in consequence the electromagnet S₁₉ is deenergized to set free the plunger S₂₀. As the result the clutch lever S₁₄ is brought back to its original position by the force of the tension spring S₁₇, and the clutch S₉ is detached from the clutch teeth of the rotating worm S₈ thereby to stop the rotation of the shaft S₄, pinion S₅ and in consequence the spiral feed blade S with the eventual cease of the delivery of dough received in the dough hopper 10. Namely, the vertical movement of the sleeve 30 and in consequence the intermittent rotation of the spiral feed blade S permit the delivery of dough to be started or stopped in timed relationship with the opening or closure of the dough outlet S₁₄. However, depending on the quality of dough received in the dough hopper 10 and the timing speed of the vertical movement of the cutter sleeve 30, it is possible to keep the electromagnet S₁₉ excited without deenergizing it by the cam 89 and leave the plunger S₂₀ actuated or keep the spiral feed blade S continuously rotated by other means.

Figure 7A:
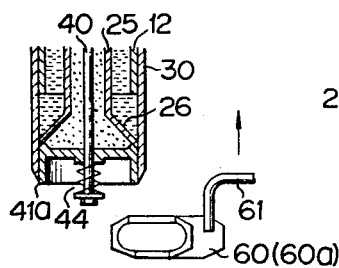
FIG. 7 represents the sequential steps of molding a doughnut according to said embodiment.
Figure 7B:
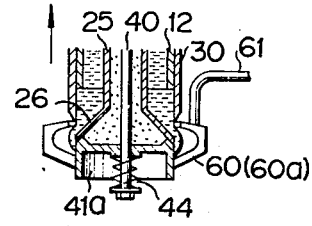
Figure 7C:
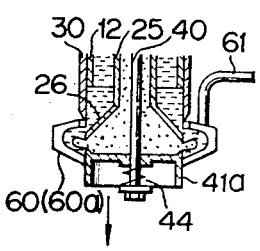
Figure 7D:
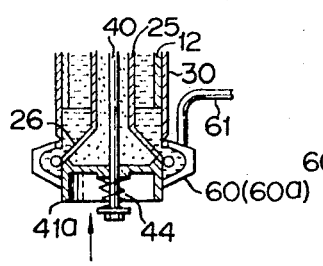
Figure 7E:
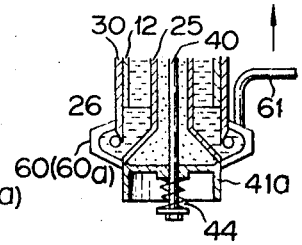
Figure 7F:
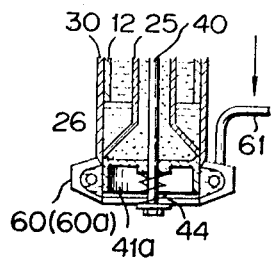
Figure 7G:
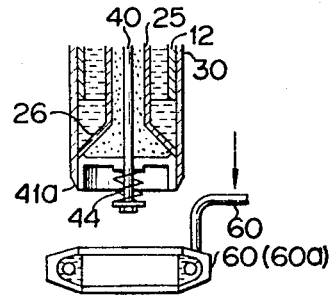
Figure 8A:
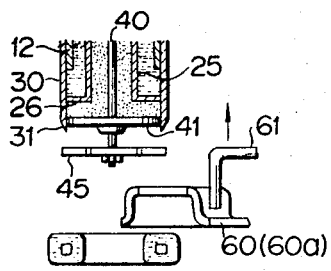
Figure 8B:
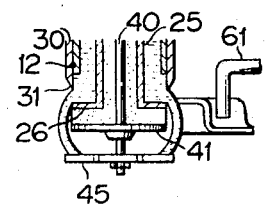
Figure 8C:
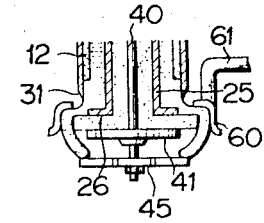
Figure 8D:
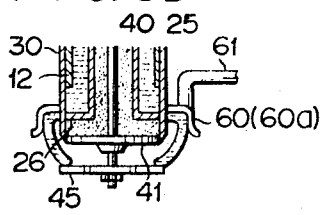
Figure 8E:
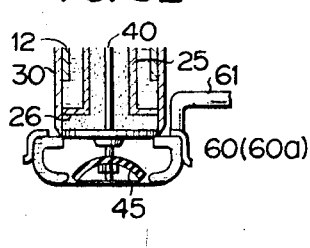
Figure 8F:
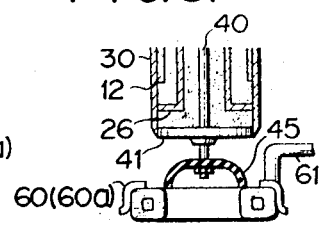

There will now be described the process of preparing doughnuts containing fillings. Referring to FIG. 7, initially the sleeve 30 stands at its lowest position, closing the dough outlet 14. The split molding bowls 60 and 60a begin to rise in an open state (FIG. 7a). Next the sleeve 30 also starts rising with the resulting rotation of the spiral feed blade S to cause the dough to be drawn out from the outlet 14 (FIG. 7b). On the other hand, the cutter cylinder 41a is pressed against the end of the support shaft 40 by the spring 44 so as to move vertically. The upper edge 43 of said cutter cylinder 41a tightly contacts the back peripheral edge of the conical cutter flange 26. Accordingly, the delivery of filling is effected by forcing down the cutter cylinder 41a under the pressure applied to the filling upon operation of the piston 50 against the force of the spring 44 (FIG. 7c). The cutting of the filling delivered and the closing of the filling outlet are carried out by the retreat of the piston after delivery and the return of the cutter cylinder 41a to its original position by the force of the spring 44 (FIG. 7d). The closed split molding bowls 60 and 60a are made to rise again up to the dough outlet (FIG. 7e). Then the split molding bowls are slowly brought down so as to cause the dough to be drawn out to the inside of the dough ring (FIG. 7f). The sleeve 30 is also made to fall and the spiral feed blade is stopped to cut the outflow of dough. After being further lowered to a prescribed position (FIG. 7g), the split molding bowls 60 and 60a are opened to take out a doughnut containing fillings. Thereafter the split molding bowls 60 and 60a are lifted again (FIG. 7a) with the resulting repetition of the aforementioned operation steps to form a continuous run.

The second embodiment of FIG. 8 uses an elastic disc 45 in molding a doughnut. There will now be described the operation of the second embodiment. Initially, the sleeve 30 stands at its lowest position and the outlets of dough and filling are closed. The split molding bowls 60 and 60a begin to rise (FIG. 8a). With the rotation of the spiral feed blade S, the dough is drawn out and the lower end of the cylindrical dough is attached to the elastic disc 45 (FIG. 8b). The split molding bowls 60 and 60a which have already been lifted are closed. At this time, the pin 50 is actuated for the delivery of filling, and the split molding bowls 60 and 60a receive dough swollen with filling (FIG. 8c). The sleeve 30 is brought down to cut the dough and filling delivered and close their outlets. The spiral feed blade S stops in timed relationship with the fall of the sleeve 30 (FIG. 8d). The split molding bowls are brought down in a closed state, thereby causing the lower end of the cylindrical dough received at the elastic disc 45 to be rolled inward (FIG. 8e). Further fall of the split molding bowls causes the inside of the dough ring to be rubbed with the outer edge of the elastic disc and filling to be distributed properly and uniformly throughout as the core of the dough (FIG. 8f). When brought to the lowest position, the split molding bowls 60 and 60a are opened to take out a dough ring. In practice the aforementioned operation is repeated.

In the third embodiment of FIG. 9, a cutter cylinder 42 provided with a groove is fitted to the end of the support shaft 40 so as to move vertically along the peripheral surface against which said cylinder 42 is pressed by the spring 44. This cutter cylinder 42 performs the same operation as in the embodiment of FIG. 7.

Figure 9A:
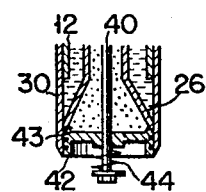
Figure 9B:
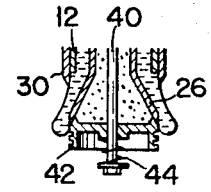
Figure 9C:
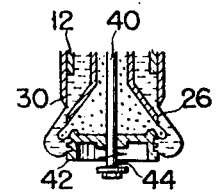
Figure 9D:
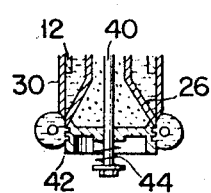
Figure 9E:
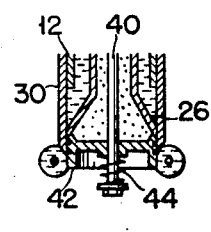

The third embodiment has the most simplified construction eliminating the elastic disc and split molding bowls 60 and 60a used in the preceding embodiments. There will now be described the operation of the third embodiment. The sleeve 30 rises from a position shown in FIG. 9a, causing dough to be drawn out along the grooved surface of the cutter cylinder 42 (FIG. 9b), followed by the delivery of filling (FIG. 9c). After delivery of filling, the cutter cylinder 42 is brought back to its original position to cut the filling drawn out and shut the filling outlet (FIG. 9d). The dough ring thus formed on the cutter cylinder 42 is removed by the sleeve which is brought down at this time (FIG. 9e).

What we claim is:

1. An automatic molding apparatus for producing ring-shaped doughnuts containing fillings, comprising a dough hopper and a filling hopper coaxially arranged in said dough hopper, each of which has an inlet opened to the air at the upper end so as to receive dough and filling under atmospheric pressure at a desired time, a dough outlet pipe vertically disposed and connected with said dough hopper, a filling outlet pipe coaxially positioned in said dough outlet pipe and connected with said filling hopper, a spiral feed blade for forcing dough down the dough outlet pipe, means to force said filling down said filling outlet pipe, a cutting flange having the same outside diameter as of said material outlet pipe and fixed to one end of said filling outlet pipe so as to form an annular material outflow port between it and said material outlet pipe, a delivery means connected with said filling pipe and having the same outside diameter as said material outlet pipe for forming an annular filling delivery port below said cutting flange, a sleeve fitted to be slidable up and down on the outer peripheral surface of said material outlet pipe and having a blade edge at its lower tip edge, and a mechanism for controlling said filling force means and elevating and lowering said sleeve in desired timed relationships, wherein said means to force said filling includes a reciprocating piston fitted in said filling outlet pipe and wherein said piston is provided with a one-way valve which closes on its withdrawal to pass said filling.

2. An apparatus according to claim 1 wherein said mechanism includes a motor driving a shaft, a plurality of cams on said shaft, rollers following said cams, and links connected to said rollers and also connected to said piston and said sleeve.

3. An automatic molding apparatus for producing ring-shaped doughnuts containing fillings, comprising a dough hopper and a filling hopper coaxially arranged in said dough hopper, each of which has an inlet opened to the air at the upper end so as to receive dough and filling under atmospheric pressure at a desired time, a dough outlet pipe vertically disposed and connected with said dough hopper, a filling outlet pipe coaxially positioned in said dough outlet pipe and connected with said filling hopper, a spiral feed blade for forcing dough down the dough outlet pipe, means to force said filling down said filling outlet pipe, a cutting flange having the same outside diameter as of said material outlet pipe and fixed to one end of said filling outlet pipe so as to form an annular material outflow port between it and said material outlet pipe, a delivery means connected with said filling pipe and having the same outside diameter as said material outlet pipe for forming an annular filling delivery port below said cutting flange, a sleeve fitted to be slidable up and down on the outer peripheral surface of said material outlet pipe and having a blade edge at its lower tip edge, and a mechanism for controlling said filling force means and elevating and lowering said sleeve in desired timed relationships and also including a plurality of molding bowls which close to form a ring mold and which surround the outside of the sleeve from both sides, and means to elevate and lower and open and close said bowls.

4. An apparatus according to claim 3 wherein the means for elevating and lowering and opening and closing said bowls is a cam and link mechanism which operates at predetermined times.

5. An apparatus according to claim 3 wherein said molding bowls have such cross-sections as will form a closed annular space when they surround the sleeve from both sides.

6. An apparatus according to claim 3 wherein said molding bowls have cross-sections which form an annular space opened on the lower end surface when they surround the sleeve from both sides.

7. An apparatus according to claim 3 wherein said cutting flange is in the form of a flat plate, said means for forming a filling delivery port is a cutting blade disk secured with a fixed clearance from the cutting blade flange to the lower end of a supporting shaft provided in the center of the filling outlet pipe and said molding bowls surround the outside of the sleeve from both sides and can be elevated and lowered and opened and closed, and a mechanism for elevating and lowering and opening and closing said molding bowls in a timed relation with reciprocating said piston.

8. An apparatus according to claim 7 wherein said molding bowls have such cross-sections as will form a closed annular space when they surround the sleeve from both sides.

9. An apparatus according to claim 7 wherein said molding bowls have such cross-sections as will form an annular space opened on the lower end surface when they surround the sleeve from both sides and have an elastic disk of such size as will receive the lower end portion of the outflow dough material with a proper clearance from and below said cutting blade cylinder.

10. An automatic molding apparatus for producing ring-shaped doughnuts containing fillings, comprising a dough hopper and a filling hopper coaxially arranged in said dough hopper, each of which has an inlet opened to the air at the upper end so as to receive dough and filling under atmospheric pressure at a desired time, a dough outlet pipe vertically disposed and connected with said dough hopper, a filling outlet pipe coaxially positioned in said dough outlet pipe and connected with said filling hopper, a spiral feed blade for forcing dough down the dough outlet pipe, means to force said filling down said filling outlet pipe, a cutting flange having the same outside diameter as of said material outlet pipe and fixed to one end of said filling outlet pipe so as to form an annular material outflow port between it and said material outlet pipe, a delivery means connected with said filling pipe and having the same outside diameter as said material outlet pipe for forming an annular filling delivery port below said cutting flange, a sleeve fitted to be slidable up and down on the outer peripheral surface of said material outlet pipe and having a blade edge at its lower tip edge, and a mechanism for controlling said filling force means and elevating and lowering said sleeve in desired timed relationships wherein there are provided a plurality of hoppers for fillings, a plurality of separated filling outlets together forming an annular outlet, and a means for conveying said fillings from said hoppers to the filling outlets without mixing the fillings with each other.

11. An automatic molding apparatus for producing ring-shaped doughnuts containing fillings, comprising a dough hopper and a filling hopper coaxially arranged in said dough hopper, each of which has an inlet opened to the air at the upper end so as to receive dough and filling under atmospheric pressure at a desired time, a dough outlet pipe vertically disposed and connected with said dough hopper, a filling outlet pipe coaxially positioned in said dough outlet pipe and connected with said filling hopper, a spiral feed blade for forcing dough down the dough outlet pipe, means to force said filling down said filling outlet pipe, a cutting flange having the same outside diameter as of said material outlet pipe and fixed to one end of said filling outlet pipe so as to form an annular material outflow port between it and said material outlet pipe, a delivery means connected with said filling pipe and having the same outside diameter as said material outlet pipe for forming an annular filling delivery port below said cutting flange, a sleeve fitted to be slidable up and down on the outer peripheral surface of said material outlet pipe and having a blade edge at its lower tip edge, and a mechanism for controlling said filling force means and elevating and lowering said sleeve in desired timed relationship, wherein said cutting flange is in the form of a flat plate and said means for forming a filling delivery port is a cutting blade cylinder which is fitted to the lower end of a supporting shaft provided in the center of the filling outlet pipe and wherein an elastic disk is fixed to the said supporting shaft below the said cutting blade cylinder.

* * * * *